United States Patent
Khadkikar et al.

[19]

[11] Patent Number: 6,079,121
[45] Date of Patent: Jun. 27, 2000

[54] HUMIDITY-MODULATED DUAL-SETPOINT TEMPERATURE CONTROLLER

[75] Inventors: Prasad S. Khadkikar, Seville; James A. Tennant, Perrysville; Philip B. Eder, Mansfield; Bernd D. Zimmermann, Ashland, all of Ohio

[73] Assignee: Ther-O-Disc, Incorporated, Mansfield, Ohio

[21] Appl. No.: 09/128,331

[22] Filed: Aug. 3, 1998

[51] Int. Cl.[7] ............................................... F26B 19/00
[52] U.S. Cl. ........................... 34/528; 34/531; 34/535; 236/47; 62/176.6; 307/650; 307/651
[58] Field of Search ........................... 34/524, 526, 528, 34/531, 535, 552, 562; 219/492, 494, 497, 501; 236/44 C, 47; 62/176.6; 318/266, 281, 287; 307/650, 651, 652

[56] References Cited

U.S. PATENT DOCUMENTS

| | | |
|---|---|---|
| 4,019,259 | 4/1977 | Veraart . |
| 4,213,250 | 7/1980 | Hawkins . |
| 4,231,166 | 11/1980 | McMillan . |
| 4,275,508 | 6/1981 | Jones . |
| 4,286,391 | 9/1981 | Gerry . |
| 4,397,101 | 8/1983 | Rickard . |
| 4,467,182 | 8/1984 | Merkel ..................................... 219/497 |
| 4,519,145 | 5/1985 | Mandel . |
| 4,525,937 | 7/1985 | Strandberg, Jr. et al. . |
| 4,642,907 | 2/1987 | Best . |
| 4,763,425 | 8/1988 | Grennan ..................................... 34/552 |
| 4,827,627 | 5/1989 | Cardoso ..................................... 34/526 |
| 4,842,192 | 6/1989 | Range et al. . |
| 4,889,280 | 12/1989 | Grald et al. ........................... 236/44 C |
| 4,901,186 | 2/1990 | Tennant ..................................... 361/106 |
| 4,911,357 | 3/1990 | Kitamura ............................... 236/44 E |
| 4,983,897 | 1/1991 | Tennant ..................................... 318/287 |
| 5,023,529 | 6/1991 | Tennant ..................................... 318/266 |
| 5,101,575 | 4/1992 | Bashark . |
| 5,128,516 | 7/1992 | Plasko et al. .......................... 219/497 |
| 5,281,956 | 1/1994 | Bashark . |
| 5,291,667 | 3/1994 | Joslin et al. . |
| 5,347,727 | 9/1994 | Kim . |
| 5,367,265 | 11/1994 | Guadette . |
| 5,444,924 | 8/1995 | Joslin et al. . |
| 5,454,171 | 10/1995 | Ikeda et al. . |
| 5,555,641 | 9/1996 | Lee . |
| 5,570,520 | 11/1996 | Huffington ............................... 34/535 |
| 5,649,372 | 7/1997 | Souza . |
| 5,673,497 | 10/1997 | St. Louis . |
| 5,737,852 | 4/1998 | Shukla et al. . |
| 5,955,793 | 9/1999 | Khadkikar et al. ..................... 307/117 |

*Primary Examiner*—Stephen Gravini
*Attorney, Agent, or Firm*—Harness, Dickey & Pierce, P.L.C.

[57] ABSTRACT

A humidity-modulated dual-setpoint temperature controller is disclosed in which the two setpoints of the temperature controller are adjusted as a function of measured humidity. Parameters other than humidity could also be used to adjust the dual setpoints of the temperature controller. The controller is particularly useful in controlling the heater element of a clothes dryer in order to improve the energy efficiency of the dryer.

17 Claims, 5 Drawing Sheets

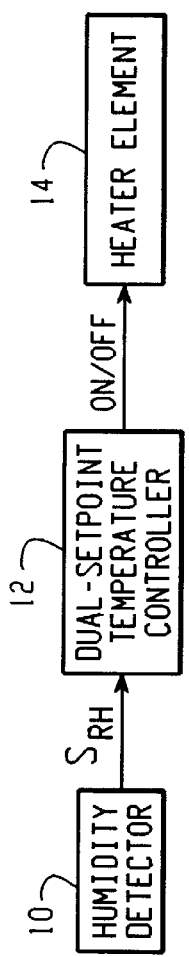
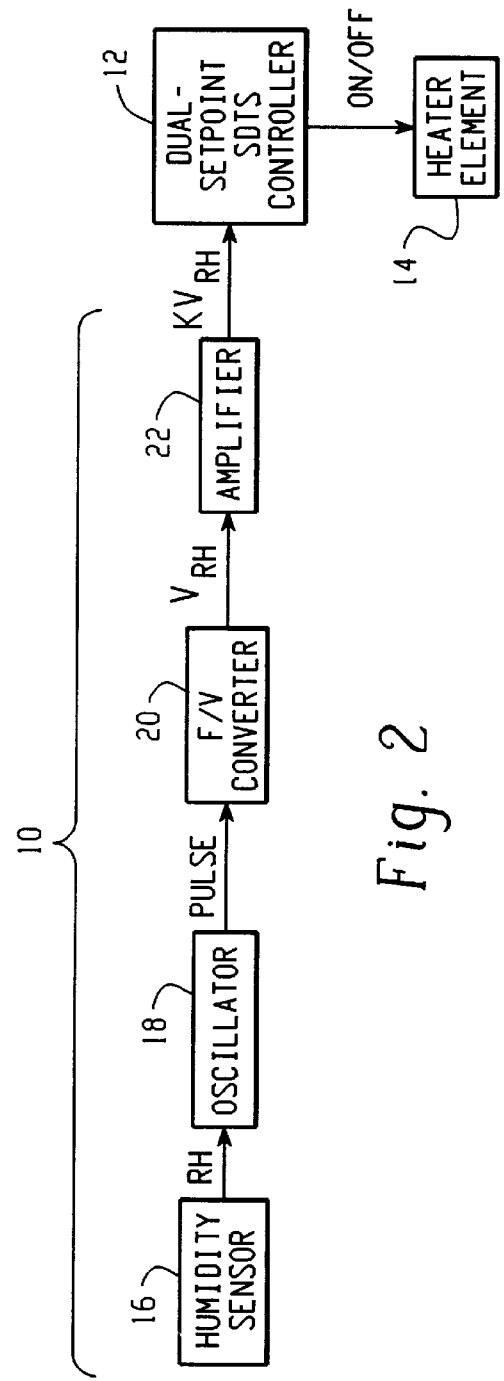
Fig. 1
Fig. 2

HUMIDITY-MODULATED DUAL-SETPOINT TEMPERATURE CONTROLLER

BACKGROUND OF THE INVENTION

The present invention is directed toward the field of temperature controllers. In particular, a dual-setpoint temperature controller is disclosed that controls the temperature of a device at two particular setpoints that are modulated by the output of a humidity detection sub-system.

The preferred embodiment of the present invention is particularly useful for controlling the heating element of a clothes dryer as a function of temperature and relative humidity ("RH"). This same circuitry could be used with other appliances or devices in which temperature and RH are used as control variables, and could also be used with devices in which temperature and some other measurable parameter are used as control variables.

In the preferred clothes dryer application, it is desirable to automatically control the temperature in the dryer so as to minimize heat damage to the clothes, and at the same time to minimize power consumption of the dryer. When the dryer is first activated (beginning of a cycle), the clothes are very wet, and therefore the RH in the dryer will be quite high (i.e. greater than 80%). But, as the clothes begin to dry, and moisture is removed from the dryer system, the RH measured in the dryer will drop. At the same time that the RH is dropping, the temperature in the dryer typically rises, potentially causing heat damage to the clothing. At some point near the end of the drying cycle, the RH drops to a point where it is desirable to turn off the heater element in order to prevent damage to the clothes, and also to conserve energy.

Presently known techniques for controlling the dryer heater as the RH drops to a low value include: (1) resistive strips on the interior of the dryer drum, which are sensed in order to determine whether the clothes are moist and if not, to shut off the heater element for a certain period of time; (2) a bi-metal thermostat positioned in the exhaust of the dryer that detects the rise in temperature of the exhaust, which is typically associated with a drop in RH in the drum, and which can be used to turn off the heater element for some period of time; and (3) microprocessor controlled systems that measure temperature and RH and perform some complex calculations in order to determine whether or not to turn the heater element off as the RH drops below a particular threshold value. Each of these techniques suffers from several disadvantages that are overcome by the present invention.

The resistive strip technique typically requires some type of sophisticated signal conditioning and monitoring circuitry. Since the moist clothes only momentarily come into contact with the resistive strips, circuitry must be included that senses these momentary circuit connections, and which counts the number of connections per unit time in order to infer the RH of the clothes. A microprocessor or microcontroller is typically utilized for this function. This is a costly device. The thermostat technique only approximates the actual RH in the exhaust, and may, under certain conditions, be an inaccurate method to infer clothes wetness. And as noted with the resistive strip technique, other microprocessor-based solutions that actively measure both temperature and RH are also more complex and costly solutions. In addition to these disadvantages, none of the presently known techniques enables a gradual reduction in the exhaust temperature of the dryer after a particular RH threshold has been reached, as does the present invention.

Therefore, there remains a general need in this art for a cost-effective sensor modulated temperature controller, in particular one in which the sensor is a RH detector.

There remains a more particular need for such a temperature controller that nominally controls temperature at two initial setpoints, and which is responsive to a change in measured RH beyond a particular threshold value by modifying the setpoints.

There remains yet an additional need for such a temperature controller for use with the heating element of a clothes dryer or other appliance in which the measured RH causes a reduction in the dual setpoints of the temperature controller beyond a particular threshold value in order to: (1) minimize heat damage to the clothes in the dryer; and (2) conserve energy.

SUMMARY OF THE INVENTION

The present invention overcomes the problems noted above and satisfies the needs in this field for a relative humidity-modulated dual-setpoint temperature controller preferably consisting of a RH detection system coupled to a dual-setpoint temperature control circuit. In particular, the present invention is especially useful as an automatic RH/temperature controller for controlling the heating element of a clothes dryer. By altering the dual-setpoints of the temperature control circuit as a function of RH, as the RH drops below a particular threshold value, the present invention simultaneously provides thermal-damage protection for the clothes in the dryer, and conserves energy.

The RH detection system can be any type of circuitry that is capable of directly (or indirectly) measuring or deriving clothes wetness, and developing a signal that can be coupled to the dual-setpoint temperature controller in order to modulate its setpoints. Preferably this system includes a capacitive RH sensor and associated signal conditioning circuitry, such as an oscillator, frequency/voltage converter and amplifier, for generating a voltage signal that is proportional to the measured RH. Other types of RH detection systems can also be utilized with the present invention.

The dual-setpoint temperature control circuit can be any type of thermal measurement sensor and circuitry that is biased to generate an on/off control signal at two distinct setpoints, that a controlled element, such as a heater, is turned on at one setpoint and turned off at another, distinct setpoint, the temperature range between the two setpoints comprising a control deadband. Preferably this control circuit comprises a high sensitivity diode temperature sensor with adjustable current source and feedback control as described in detail in co-pending and commonly assigned U.S. patent application Ser. No. 09/023,013, titled "High Sensitivity Diode Temperature Sensor with Adjustable Current Source." The disclosure and teaching of this application is hereby incorporated into this application by reference. Other types of dual-setpoint temperature control circuits could also be used with the present invention.

A preferred embodiment of the present invention is a RH-modulated dual-setpoint temperature controller, comprising a RH detector and a dual-setpoint temperature controller coupled to the RH detector, wherein the dual setpoints of the temperature controller are modulated based on the RH detected by the RH detector.

In another embodiment of the present invention, the RH detector is a capacitive RH sensor and accompanying signal conditioning circuitry.

In another embodiment of the present invention, the dual-setpoint temperature controller uses a dual-setpoint Schottky diode temperature sensor (SDTS).

Another, more specific embodiment of the present invention is a RH-modulated dual-setpoint temperature controller for use with a clothes dryer, comprising a capacitive RH sensor; a dual-setpoint temperature controller coupled to the capacitive RH sensor; and a switch, coupled to dual-setpoint temperature controller, for applying power to the heating element of the clothes dryer, wherein the RH measured by the capacitive RH sensor adjusts the dual setpoints of the temperature controller so as to switch the heater at lower temperatures at a lower measured RH.

Another embodiment of the present invention includes a sensor-modulated temperature controller, comprising sensor means for detecting a physical parameter; means for initializing the temperature controller to switch an attached load at two temperature setpoints; and means for modulating the temperature setpoints based upon the detected physical parameter.

Yet another embodiment of the present invention includes a multi-parameter controller, comprising a first parameter detector; a second parameter detector; a dual-setpoint second parameter controller coupled to the second parameter detector that generates a control signal at two distinct second parameter setpoints; and adjustment circuitry coupled to the first parameter detector and the dual-setpoint second parameter controller for adjusting the two distinct second (parameter setpoints based on a measured first parameter value. Other embodiments of the present invention will become clear when reviewing the associated drawings and detailed description thereof, set forth below.

The present invention has many advantages, particularly when used as a controller for a clothes dryer heating element, including: (1) low cost; (2) low complexity; (3) dual-parameter control; (4) ease of integration; (5) improved efficiency; and (5) limited high-temperature exposure of the clothes, thus prolonging their lifetime.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as win become apparent from the following description when read in conjunction with the accompanying drawings wherein:

FIG. 1 is block diagram of a RH-modulated dual-setpoint temperature control system according to the present invention for use with a clothes dryer heating element.

FIG. 2 is an expanded block diagram of FIG. 1 in which the RH detector is shown as a capacitive RH sensor and accompanying signal conditioning circuitry.

DETAILED DESCRIPTION OF THE DRAWINGS

Figure 3:
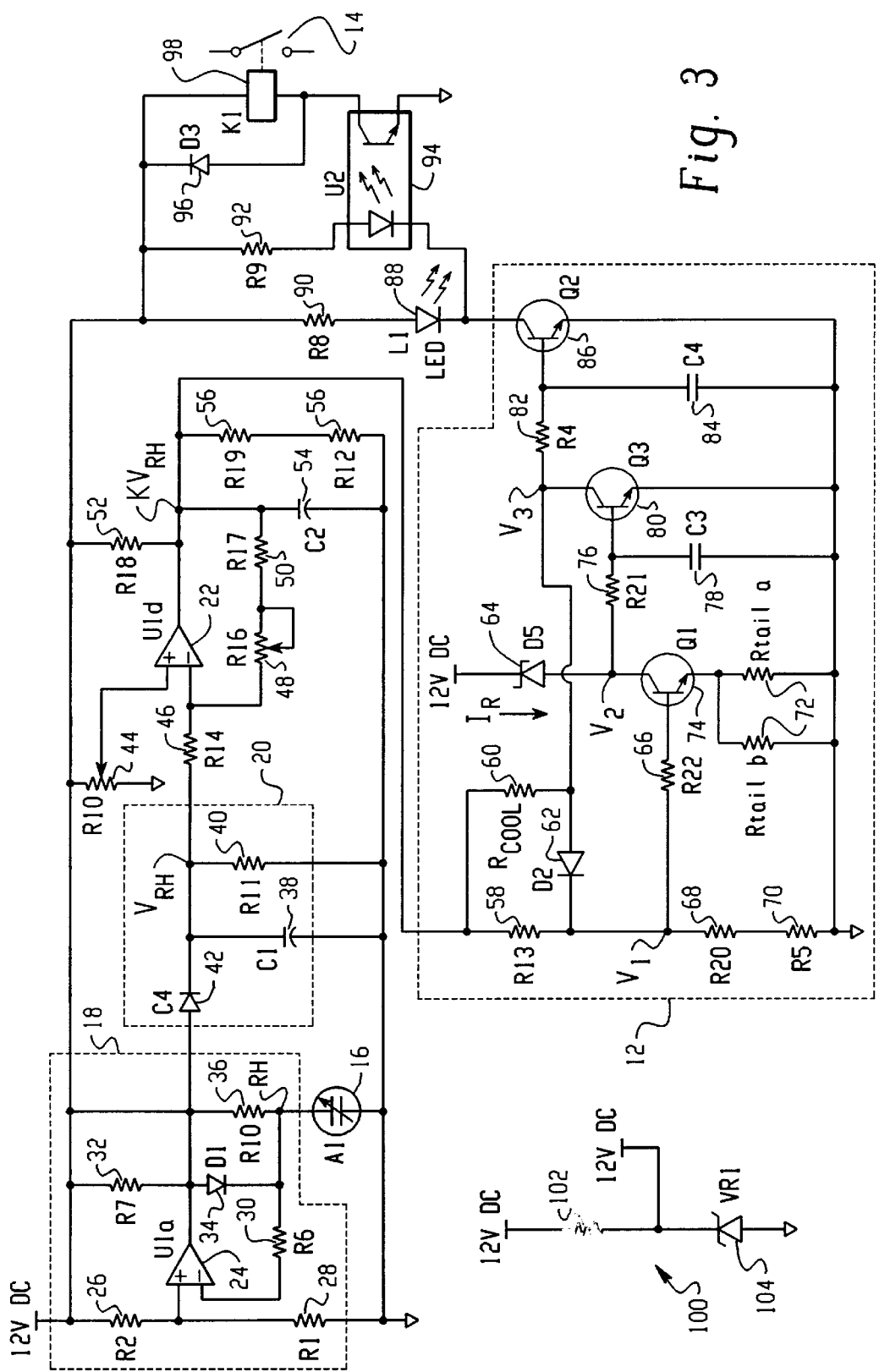
FIG. 3 is a detailed circuit schematic of the RH-modulated dual-setpoint temperature control system shown in FIG. 2 for use as a clothes dryer heater element controller.

Referring now to the drawings, FIG. 1 sets forth a block diagram of a RH-modulated dual-setpoint temperature control system according to the present invention, which is particularly well suited for use in controlling the heating element of a clothes dryer. The system includes a RH detector 10, a dual-setpoint temperature control circuit 12, and a control element 14, which in the preferred clothes dryer application is the heating element.

The RH detector 10 could be any type of direct RH measurement sensor, such as a capacitive RH sensor, or could, alternatively, be an indirect RH measurement device, such as one or more temperature measuring devices, resistive strips inside the dryer drum, or a current measuring hall-effect sensor that monitors the motor load and infers RH based on the measured loading. Other types of direct and indirect RH measuring systems could also be used for this element. Regardless of the particular type of RH detector 10, this device generates some type of signal ($SR_{RH}$)hich is proportional (either linear or non-linear) to the measured RH in the device under control.

The RH output signal $S_{RH}$ from the RH detector 10 is coupled to the dual-setpoint temperature controller 12, and is used to modulate (or adjust) the setpoints of this circuit 12 under certain conditions. The dual-setpoint temperature controller 12 is a temperature measuring circuit that generates an "on/off" output signal at two distinct temperatures, $T_{ON}$ and $T_{OFF}$. In the clothes dryer application, for example, $T_{ON}$ could be around 45° C. and $T_{OFF}$ could be around 60° C. In this example situation, the dual-setpoint temperature controller 12 turns the heating element 14 on as long as the measured temperature in the dryer is less than $T_{ON}$, and turns the heater 14 off if the measured temperature is greater than $T_{OFF}$. It is important in this particular application to turn the heater off above a particular setpoint temperature in order to prevent heat-damage to the clothing. Between $T_{ON}$ and $T_{OFF}$ is a deadband range, or hysteresis, over which temperature range the controller 12 does not switch states.

As described in more detail below, particularly with respect to the description of FIG. 3, the RH-modulated dual-setpoint temperature control system of the present invention is configured such that when a particular RH threshold is measured by the RH detector 10, the output signal from this device, $S_{RH}$, causes the setpoints ($T_{ON}$, $T_{OFF}$) of the temperature controller 12 to change, i.e. the RH detector modulates the temperature controller setpoints. In the exemplary clothes dryer application, the RH threshold is set to be a relatively low value, such as around 20% RH, and when the RH drops beyond this point, the output signal $S_{RH}$ from the RH detector causes the setpoints ($T_{ON}$, $T_{OFF}$) to drop. By modulating the temperature setpoints in this manner, the present invention simultaneously conserves up to 15% in energy consumption over a conventional clothes dryer heater controller, and also prevents heat damage due to excessive temperatures.

FIG. 2 is an expanded block diagram of FIG. 1 in which the RH detector 10 is shown as a capacitive RH sensor 16 and accompanying signal conditioning circuitry (18, 20, 22), and the dual-setpoint temperature controller 12 is shown as a controller using a dual-setpoint Schottky diode temperature sensor (SDTS), which is described more fully in co-pending U.S. application Ser. No. 09/023,013, the disclosure and teaching of which has been incorporated into the present application by reference. Like the system shown in FIG. 1, the expanded block diagram of FIG. 2 is preferably for use with a heater element 14 of a clothes dryer. Alternatively, this circuitry could be used in other applications. In addition, sensors for measuring control parameters other than RH could be used in place of the RH sensor 16 and associated circuitry.

In this example system, the RH detector includes a capacitive RH sensor 16, an oscillator 18, a frequency to voltage converter 20, and an amplifier 22. The RH sensor 16 is preferably located in the exhaust output of the dryer, although, alternatively, it could be located at another location within the dryer. At relatively high RH levels, such as >50%, the capacitance measured by the RH sensor 16 is high, whereas at low RH levels the capacitance decreases. This measured capacitance, which is proportional to RH, drives an oscillator circuit 18, which generates a pulsed output (Pulse) that is proportional in frequency to the capacitance of the RH sensor 16. The pulsed output from the oscillator 18 is then converted into a DC signal ($V_{RH}$) by the frequency-to-voltage ("F/V") converter 20. This voltage signal ($V_{RH}$) is then amplified by amplifier 22 to form an amplified voltage signal ($KV_{RH}$) that is proportional to the measured RH level in the exhaust of the dryer.

The amplified voltage signal $KV_{RH}$ is used to produce a proportional current value $I_R$, which reverse-biases the diode temperature sensor in the SDTS circuit 12. As described in more detail below, and in co-pending application Ser. No. 09/023,013, this reverse current level $I_R$ establishes the dual setpoints ($T_{ON}$, $T_{OFF}$) of the SDTS temperature controller 12. Thus, if RH decreases, $I_R$ decreases, thereby adjusting the thermal switch points for the SDTS to a lower value. Likewise, if the measured RH increases, $I_R$ increases, thereby adjusting the thermal switch points to a higher value.

Turning now to FIG. 3, a detailed circuit schematic is set forth of the RH-modulated dual-setpoint temperature control system shown in FIG. 2 for use as a clothes dryer heater element controller. This detailed schematic includes: a capacitive RH sensor 16; oscillator circuit 18; F/V converter 20; amplifier circuitry 22; dual-setpoint SDTS temperature control circuit 12; and heater element 14 (not explicitly shown). The oscillator circuit 18, F/V converter 20, amplifier circuitry 22, and relay 98 in FIG. 3 preferably operate from a 12VDC source while the Schottky diode 64 is connected to 5VDC, although, alternatively, other power arrangements could be utilized. Power converter 100 includes resistor 102 and Zener diode 104, which, together, provide a 5VDC power signal for powering the dual-setpoint SDTS controller 12.

The capacitive RH sensor 16 is preferably located in the exhaust output of the dryer, although it could be located elsewhere. The capacitance of this sensor changes as a function of RH, affecting the oscillating frequency of oscillator 18. The change in oscillating frequency manifests itself as a change in pulse width of the signal going into the F/V converter 20. The oscillator circuit 18 consists of op-amp 24, biasing resistors 26, 28, pull-up resistor 32, and a feedback network consisting of diode 34 and resistor 30. By biasing the "+" input of the op-amp 24 to a particular voltage level (using resistor divider 26, 28, and by feeding back the op-amp output signal through the feedback network (which is also coupled to the capacitive RH sensor 16) to the "−" input of the op-amp 24, the output of the oscillator circuit is a relatively high-frequency pulse signal (about 100 KHz) in which the width of the pulses is proportional to the capacitance of the RH sensor 16.

This oscillating voltage signal is coupled to the F/V converter 20, which converts the oscillating signal into a proportional voltage at node $V_{RH}$. The F/V converter 20 consists of blocking diode 42, capacitor 38 and resistor 40. These components comprise a "peak-follower" type of F/V converter. (Other types of F/V converters could also be used in place of this particular type of circuit.) By charging and discharging the RC network 38, 40 through the blocking diode 42, this circuit 20 converts the oscillating voltage signal into a relatively stable small-signal DC voltage output signal $V_{RH}$. The amplitude of $V_{RH}$ is proportional to the frequency of the oscillating voltage signal, and thus $V_{RH}$ is proportional to the measured RH.

The relatively small-signal $V_{RH}$ voltage level is then amplified by a particular amount ("K") using amplifier circuitry 22. This amplifier circuitry consists of op-amp 22, biasing potentiometer 44, pull-up resistor 52, and feedback network consisting of capacitor 54, resistors 46, 50, and potentiometer 48. Resistors 56 are used for test purposes. The configuration of this amplification circuitry represents a conventional op-amp amplifier circuit in which the values of the various resistors set the amplification level K, as is well-known in this art. Potentiometers 44 and 48 can be used to change (or trim) the amplification level. The output of the amplifier circuit 22, at node $KV_{RH}$, is a 5–7 volt analog voltage signal that is proportional to the humidity measured by the capacitive humidity sensor 16. This signal ($KV_{RH}$) is used to modulate (or adjust) the current source of the dual-setpoint SDTS temperature controller 12, which in turn adjusts the two thermal switch points ($T_{ON}$, $T_{OFF}$) of the SDTS. In this manner, the RH sensor 16 modulates the setpoints of the SDTS 12.

The operation of the dual-setpoint SDTS 12 is described in more full detail in co-pending U.S. application Ser. No. 09/023,013 ("the '013 application"), which has been previously incorporated herein by reference. The '013 application describes a high-sensitivity diode temperate sensor circuit that includes a reverse-biased diode, such as a Schottky diode, and an adjustable constant current source for biasing the diode into a reverse operating region. The constant current source biases the diode at a particular reverse leakage current that corresponds to a temperature window over which the reverse voltage across the diode exhibits a linear response of several hundred mV/° C. The adjustable reverse leakage currents sets the beginning of the temperature window over which the diode's reverse voltage will respond. This large change in diode reverse voltage (from 100–500 mV/° C.) over a relatively small temperature window (about 5–20° C.) can be used as a signal to switch power to an attached electrical load. The theory of operation of this sensor is described in more detail in the '013 application.

Figure 4:
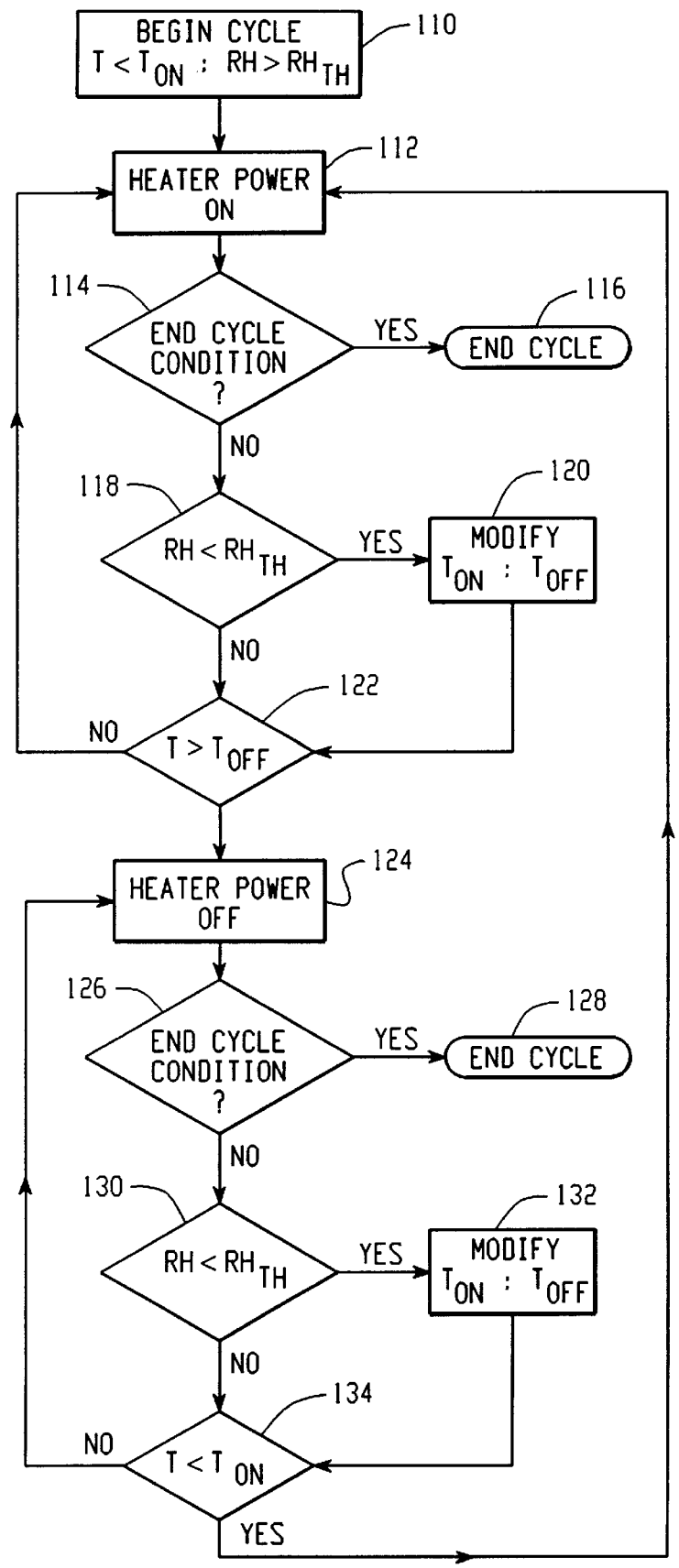
FIG. 4 is a flow chart showing the method of operation of the RH-modulated dual-setpoint temperature controller of the present invention.

FIG. 4 of the '013 application shows a dual-setpoint SDTS circuit for use as a defrost controller in a refrigeration application that is conceptually similar to the SDTS controller 12 shown in FIG. 3 of the present application. The main difference between these two circuits is that in the '013 application, the reverse-bias current ($I_R$) through the Schottky diode temperature sensor is set by a constant current source, which is adjusted by a feedback mechanism, whereas in the present application the reverse-bias current ($I_R$) through the Schottky diode temperature sensor 64 is set by a variable current source that varies in response to the voltage at node $KV_{RH}$, and which is also adjusted by a feedback mechanism.

Turning back to FIG. 3 of the present application, the dual-setpoint SDTS controller 12 includes a high-sensitivity diode temperature sensor 64, a variable current source, a feedback control circuit, bipolar driver circuitry, isolation circuitry 94, and relay circuitry 98. The variable current source includes resistors 58, 60, 66, 68, 70, 72 and transistor 74. The feedback control circuit includes resistor 76, capacitor 78, transistor 80, and diode 62. The bipolar driver circuitry includes resistor 82, capacitor 84 and bipolar driver 86. The isolation circuitry includes opto-isolator 94 and pull-up resistor 92, and the relay circuitry includes relay 98 and diode 96. Although not explicitly shown, the relay 98 is coupled to the heater element 14, and controls the by application of AC power to the heater. Also shown in this figure is a pull-up resistor 90 coupled to an LED 88, which is used for diagnostic purposes (or potentially display purposes) to show when the circuit is applying power to the heater element 14.

For purposes of describing the operation of the dual-setpoint SDTS circuit 12, assume that the ambient temperature in the clothes dryer is just above 20° C., and the RH measured by the RH sensor 16 is relatively high, such as >50%. These are the initial conditions that will be present in a dryer that is full of wet clothes and that has just been activated to begin a drying cycle. (FIGS. 5 and 6, discussed in more detail below, set forth plots of temperature and RH versus time for a clothes dryer using the present invention and a conventional dryer, respectively.) At this initial condition, the voltage at node $KV_{RH}$ is at a relatively high level, i.e., closer to 7V.

The higher voltage level at node $KV_{RH}$ results in a relatively high current through resistors 58, 68 and 70. This higher current, in turn, causes the reverse leakage current IR in the diode temperature sensor 64 to be at a higher level, thus setting the intial temperature setpoints ($T_{ON}$, $T_{OFF}$) at a higher level (such as 60° C., 45° C.). When the RH drops to a particular level, such as about 20% relative humidity, the voltage at node $KV_{RH}$ drops from 7V to around 5V, thus reducing the current through resistors 58, 68, and 70, which, in turn, causes the reverse leakage current $I_R$ in the diode temperature sensor to be at a lower level, thus adjusting the intial temperature setpoints ($T_{ON}$, $T_{OFF}$) to a lower level (such as 55° C., 40° C.). In this manner, the RH sensor 16 modulates the setpoints of the dual-setpoint temperature controller 12.

At the initial temperature of about 20° C. (see FIG. 5, 6), the resistors 58, 68, 70, 66 and 72 set the reverse leakage current $I_R$ through the Schottky diode 64 so that the voltage drop across the diode $V_{DS}$ is relatively large (about 4V). The voltage at node V2 (the output of the temperature sensor) is therefore low. When node V2 is low, the transistor 80 turns off, and thus node V3 rises until driver transistor 86 turns on. When driver transistor 86 is on, the LED 88 is illuminated by the current being pulled though it and resistor 90, and the LED in the opto-isolator 94 is also illuminated through resistor 92, thereby turning on the relay 98 and applying power to the heater element 14. An additional effect of node V3 being high is that feedback diode 62 is forward-biased, and the voltage at node V1 (which partly establishes the reverse leakage current IR though the reverse-biased diode temperature sensor 64) is at a relatively high value, thus setting the initial first thermal switch point to be at about 60° C. ($T_{OFF}$).

As the ambient temperature in the dryer increases from 20° C. to 40° C. to 60° C., $VD_5$ decreases (ultimately to about 0.1V), causing V2 to increase. The voltage increase at node V2 eventually causes transistor 80 to turn on and conduct current, which in turn causes node V3 to drop and driver transistor 86 shuts off. When driver transistor 86 shuts off, the LEDs 88, 94 are de-illuminated, and the relay is de-energized, thus removing power from the heater element 14. With V3 no longer at a high value, feedback diode 62 becomes reverse-biased, and the voltage at node V1 is at a relatively high value, thus setting the initial second thermal switch point to be at about 45° C. ($T_{ON}$).

The initial first and second thermal switch points ($T_{ON}$, $T_{OFF}$) are thus set to be about 45° C., 60° C. in the preferred clothes dryer application described in FIG. 3. The temperature $T_{ON}$ represents the temperature below which the controller will turn the heater on, and the temperature $T_{OFF}$ represents the temperature above which the controller will turn the heater off. Between $T_{ON}$ and $T_{OFF}$ is the deadband (or hysteresis) range over which temperature range the controller will not change states. These setpoints ($T_{ON}$, $T_{OFF}$) are adjusted based upon the RH detected by sensor 16, as coupled to the dual-setpoint SDTS controller 12 by voltage $KV_{RH}$. As described above, as the RH in the dryer exhaust decreases, $KV_{RH}$ which drop, which in turn reduces the current $I_R$ conducted by the diode temperature sensor 64, thus reducing the temperature switching setpoints $T_{ON}$, $T_{OFF}$.

FIG. 4 is a flow chart showing the method of operation of the RH-modulated dual-setpoint temperature controller of the present invention, in particular for use as a clothes dryer heater controller. At step 110 the dryer cycle begins. (See FIGS. 5, 6). At this point, it is assumed that the measured temperature (T) is less than $T_{ON}$, and the measured relative humidity (RH) is greater than some humidity threshold value $RH_{TH}$. In the preferred clothes dryer application, the initial temperature is about 20° C., and the initial RH level is greater than about 50%.

At step 112, power is applied to the heater based on these initial conditions. At step 114, the dryer controller checks to see whether an end cycle condition has been met, such as the expiration of a timer, a particular RH level, or some other condition. If so, then at step 116 the cycle ends, and power is removed from the heater and the main drive motor. If no end cycle condition is met, then at step 118 the measured humidity level is checked against the threshold value. If the threshold value has been reached, then at step 120 the initial thermal switching setpoints $T_{ON}$, $T_{OFF}$ are adjusted. After step 120, or in the case where the threshold humidity level has not been reached, then at step 122, the measured temperature is checked against the first thermal switch point ($T_{OFF}$) to determine if the temperature is too high. If $T_{OFF}$ has not been reached, the system remains in the heater power ON state 112, and the dryer continues to cycle through steps 112–122 until $T_{OFF}$ is reached or an end cycle condition occurs.

Once $T_{OFF}$ is reached, the heater power is removed at step 124. At step 126, the dryer controller checks to see whether an end cycle condition has been met, such as the expiration of a timer, a particular RH level, or some other condition. If so, then at step 128 the cycle ends, and power is removed from the main drive motor. If no end cycle condition is met, then at step 130 the measured RH level is checked against the threshold value. If the threshold value has been reached, then at step 132 the initial thermal switching setpoints $T_{ON}$, $T_{OFF}$ are adjusted. After step 132, or in the case where the threshold RH level has not been reached, then at step 134, the measured temperature is checked against the second thermal switchpoint ($T_{ON}$) to determine if the temperature is too low. If $T_{ON}$ has not been reached, the system remains in the heater power OFF state 124, and the dryer continues to cycle through steps 124–134 until T_{ON} is reached, or an end cycle condition occurs. Once T_{ON} is reached, control passes back to step 112, where heater power is turned on again.

Figure 5:
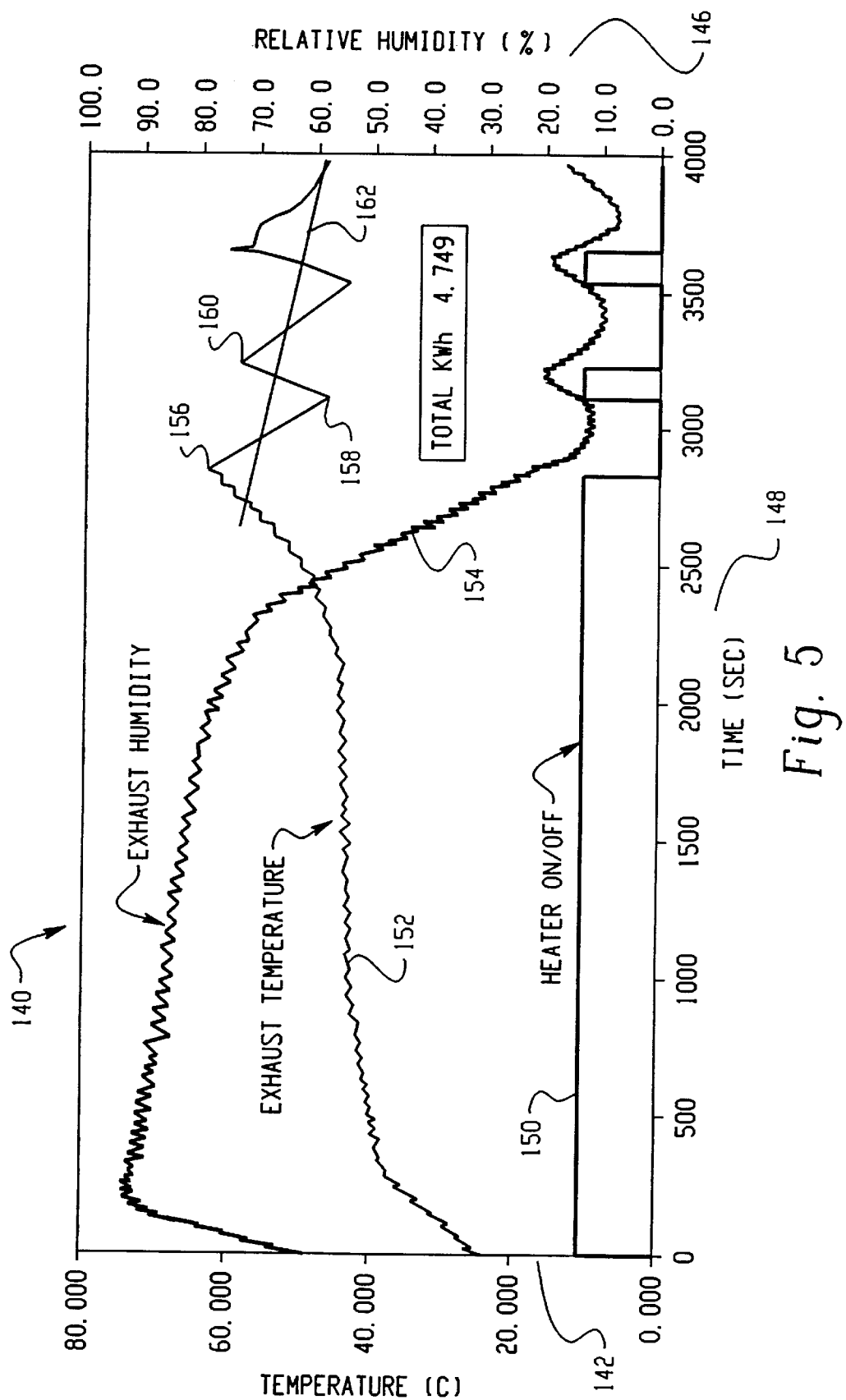
FIG. 5 is a graph showing temperature and RH versus cycle time for a clothes dryer controlled using the RH-modulated dual-setpoint temperature control system of the present invention.
Figure 6:
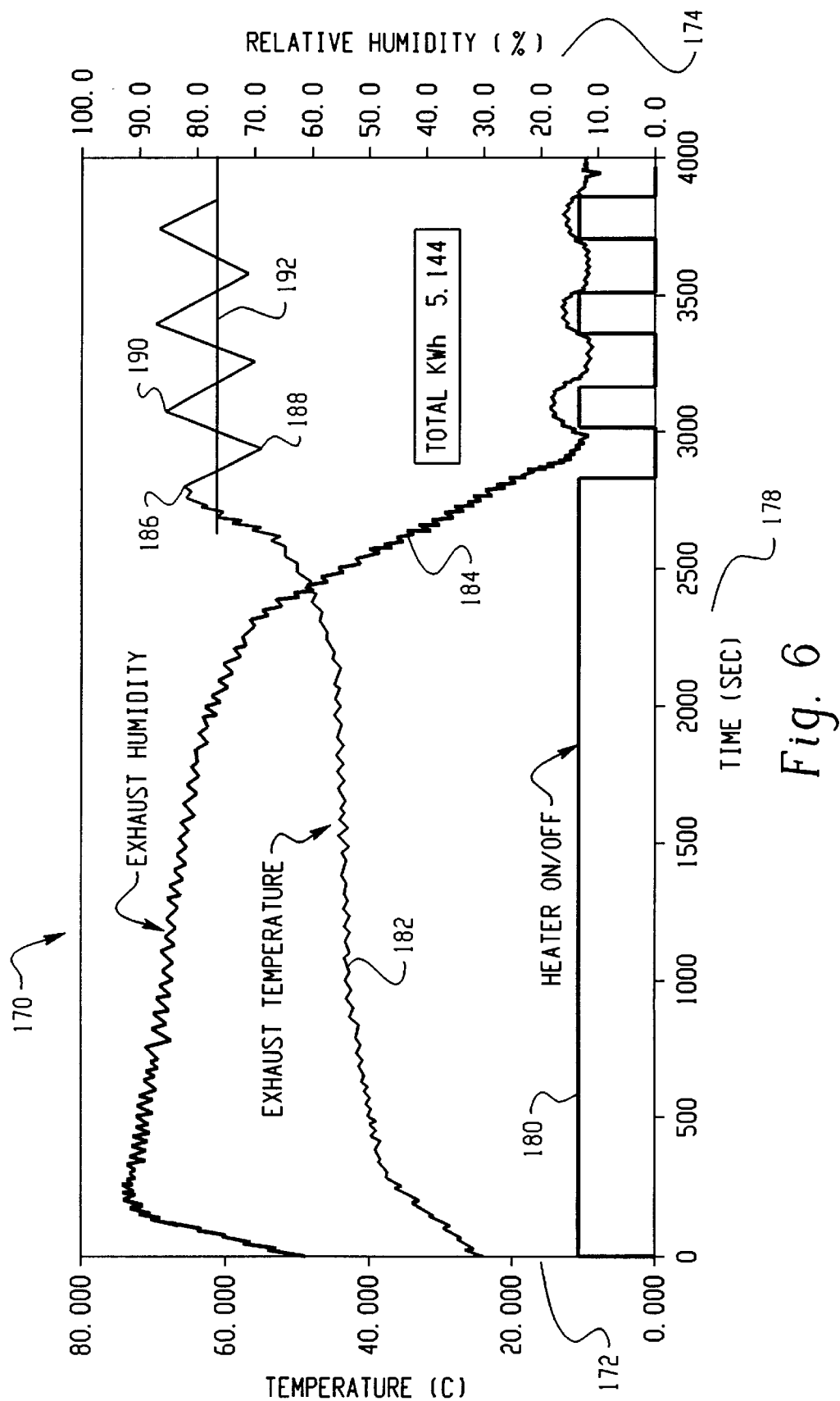
FIG. 6 is a corresponding graph showing temperature and RH versus cycle time for a presently available commercial clothes drying system utilizing the resistive strip technique for monitoring the moisture in the drum and for periodically shutting off the heater element towards the end of the cycle as the RH drops below a particular value.

FIG. 5 is a graph showing temperature and RH versus cycle time for a clothes dryer controlled using the humidity-modulated dual-setpoint temperature control system shown in FIG. 3. FIG. 6 is a corresponding graph showing temperature and RH versus cycle time for a presently available commercial clothes drying system utilizing the resistive strip technique for monitoring the moisture in the drum and for periodically shutting off the heater element towards the end of the cylce as the humidity drops below a particular value. The differences between these two graphs demonstrates the utility and some of the advantages of the present invention.

The graph 140 in FIG. 5 includes three plots. The first plot 150 represents the heater on/off signal from relay 98 as a function of time as plotted on the x-axis 148. The second plot 152 represents the exhaust temperature measured by the diode temperature sensor 64, e corresponding to the first y-axis 142. And the third plot 154 represents the exhaust RH measured by the RH sensor 16, corresponding to the second y-axis 146.

At the beginning of the cycle, the heater is on, the exhaust temperature is about room temperature (20° C.), and the relative humidity is high (>50%), due to the damp clothes in the dryer. As time progresses through the cycle, the exhaust temperature steadily rises to a plateau of about 40° C., correponding to a relative humidity of about 80%. As the clothes begin to dry, at some point (about 2200 sec.) the relative humidity will begin to drop. With less moisture in the dryer, the temperature in the drum simultaneously starts to rise. At point 156 the temperature in the dryer reaches the first initial thermal setpoint (T_{OFF}), and the heater shuts off. The relative humidity continues to drop as the clothes are further dried through continued air flow through the drum.

In this example graph, the RH threshold value that causes the thermal setpoints to modulate is set at about 20%. So, just after the dryer heater first shuts down, the output of the amplifier (KV_{RH}) drops, causing the first and second intial thermal setpoints (T_{OFF}, T_{ON}) to drop. With the heater off, the temperature in the dryer exhaust begins to drop towards point 158. Point 158 represents the modulated T_{ON} temperature. When this temperature is reached, the dual-setpoint controller 12 will re-engage the heater element, thereby causing an increase in the measured temperature. The temperature will continue to increase until point 160, which is lower in temperature than point 156, because the RH threshold for modulating the temperature setpoints has been reached. In a similar fashion, the controller will continue to reduce the temperature setpoints and cycle the heater element on/off at progressively lower temperatures until an end condition is met, such as a timer expiration, or a minimum RH value, etc.

FIG. 6 shows the same graph as FIG. 5, but with a conventional dryer that does not include the present invention. The labels on FIG. 6 (170–192) correspond to the labels on FIG. 5 (140–162) Because the dryer represented by FIG. 6 does not include the present invention, the heater element is often cycled on/off many more times, and at a higher temperature. Note that in FIG. 6 there is no gradual reduction of the temperature in the dryer after power is first removed from the heater element. The net result of not modulating the temperature setpoints during this period of the cycle is a dryer that is less energy efficient, and which, in the long run, may cause heat-damage to the clothing. The present invention overcomes these problems, as discussed herein.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A humidity-modulated dual-setpoint temperature controller for use with a clothes dryer, wherein the controller is coupled to the heater element of the dryer, comprising:
   a humidity detector; and
   a dual-setpoint temperature controller coupled to the detector, wherein the dual-setpoints of the temperature controller are modulated based on the humidity detected by the detector such that both of the dual-setpoints decrease as the humidity detected by the detector decreases.

2. The humidity-modulated dual-setpoint temperature controller of claim 1, wherein the humidity detector is a capacitive sensor.

3. The humidity-modulated dual-setpoint temperature controller of claim 2, further comprising: signal conditioning circuitry coupled between the capacitive humidity sensor and the dual-setpoint temperature controller.

4. The humidity-modulated dual-setpoint temperature controller of claim 3, wherein the signal conditioning circuitry converts the capacitance of the capacitive humidity sensor into a proportional voltage signal.

5. The humidity-modulated dual-setpoint temperature controller of claim 4, wherein the signal conditioning circuitry comprises:
   an oscillator coupled to the capacitive humidity sensor for generating a pulse signal, wherein the frequency of the pulse signal varies as a function of the capacitance of the humidity sensor; and
   a frequency to voltage converter for converting the pulse signal into a proportional voltage signal.

6. The humidity-modulated dual-setpoint temperature controller of claim 5, wherein the signal conditioning circuit further comprises an amplifier for amplifying the proportional voltage signal.

7. The humidity-modulated dual-setpoint temperature controller of claim 6, wherein the amplified proportional voltage signal modulates the dual setpoints of the temperature controller.

8. The humidity-modulated dual-setpoint temperature controller of claim 1, wherein the humidity detector comprises one or more thermal detectors.

9. The humidity-modulated dual-setpoint temperature controller of claim 1, wherein the humidity detector comprises one or more resistive strips.

10. The humidity-modulated dual-setpoint temperature controller of claim 1, wherein the humidity detector comprises a Hall-effect current sensor.

11. The humidity-modulated dual-setpoint temperature controller of claim 1, wherein the dual-setpoint temperature controller comprises a dual-setpoint Schottky diode temperature measurement system.

12. The humidity-modulated dual-setpoint temperature controller of claim 11, wherein the dual-setpoint Schottky diode temperature measurement system comprises:
   a Schottky diode temperature sensor biased to provide a switching signal at a first setpoint;
   a feedback control circuit for adjusting the biasing of the diode temperature sensor to provide the switching signal at a second setpoint; and a power switch coupled to the switching signal for switching power to a load in response to the first setpoint and for removing power from the load in response to the second setpoint.

13. The humidity-modulated dual-setpoint temperature controller of claim 12, wherein the Schottky diode temperature sensor comprises:

a reverse-biased Schottky diode; and a variable current source coupled to the diode for applying a reverse leakage current to the diode.

14. The humidity-modulated dual-setpoint temperature controller of claim 13, wherein the reverse leakage current applied by the variable current source is modulated based on the humidity detected by the humidity detector.

15. A humidity-modulated dual-setpoint temperature controller for use with a clothes dryer, comprising:

a capacitive humidity sensor;

a dual-setpoint temperature controller coupled to the capacitive humidity sensor; and a switch, coupled to dual-setpoint temperature controller, for applying power to the heating element of the clothes dryer, wherein the humidity measured by the capacitive sensor adjusts the dual setpoints of the temperature controller so as to switch the heater at lower temperatures at a lower measured humidity.

16. A sensor-modulated temperature controller comprising:

sensor means having an individual sensing mechanism for detecting a physical parameter;

means for initializing the temperature controller to switch an attached load at two temperature setpoints; and means for modulating the temperature setpoints based upon the detected physical parameter from the individual sensing mechanism.

17. A multi-parameter controller, comprising:

a first parameter detector;

a second parameter detector;

a dual-setpoint second parameter controller coupled to the second parameter detector that generates a control signal at two distinct second parameter setpoints; and adjustment circuitry coupled to the first parameter detector and the dual-setpoint second parameter controller for adjusting the two distinct second parameter setpoints based on a measured first parameter value.

* * * * *

UNITED STATES PATENT AND TRADEMARK OFFICE
CERTIFICATE OF CORRECTION

PATENT NO. : 6,079,121
DATED : June 27, 2000
INVENTOR(S) : Prasad S. Khadkikar et al It is certified that error appears in the above-identified patent and that said Letters Patent is hereby corrected as shown below:

On the Title Page, under "Assignee", "Ther-O-Disc" should be --Therm-O-Disc--.

Column 2, line 43, before "that" insert --such--.

Column 3, line 26, delete "(".

Column 3, line 48, "win" should be --will--.

Column 4, line 26, "(SR$_{RH}$)hich" should be --(S$_{RH}$) which--.

Column 7, line 12, (second occurrence), after "the" delete "by".

Column 7, line 33, "IR" should be --I$_R$--.

Column 7, line 60, "IR" should be --I$_R$--.

Column 7, line 65, "VD$_5$" should be --V$_{D5}$--.

Column 8, line 20, (first occurrence), "which" should be --will--.

Column 9, line 19, delete "e".

Signed and Sealed this

Twenty-second Day of May, 2001

Attest:

NICHOLAS P. GODICI

Attesting Officer     Acting Director of the United States Patent and Trademark Office